Sept. 19, 1961     J. F. REUTHER ET AL     3,001,123
ELECTRICAL CONTROL APPARATUS
Filed June 25, 1959     2 Sheets-Sheet 1
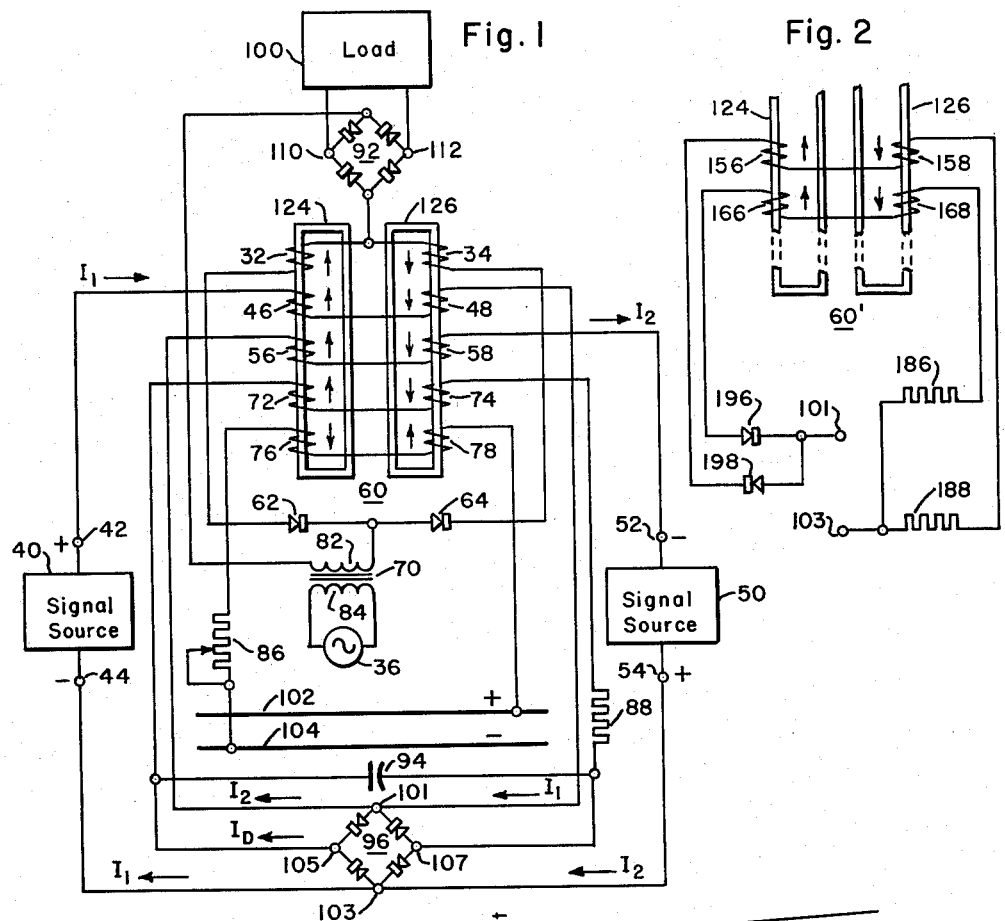
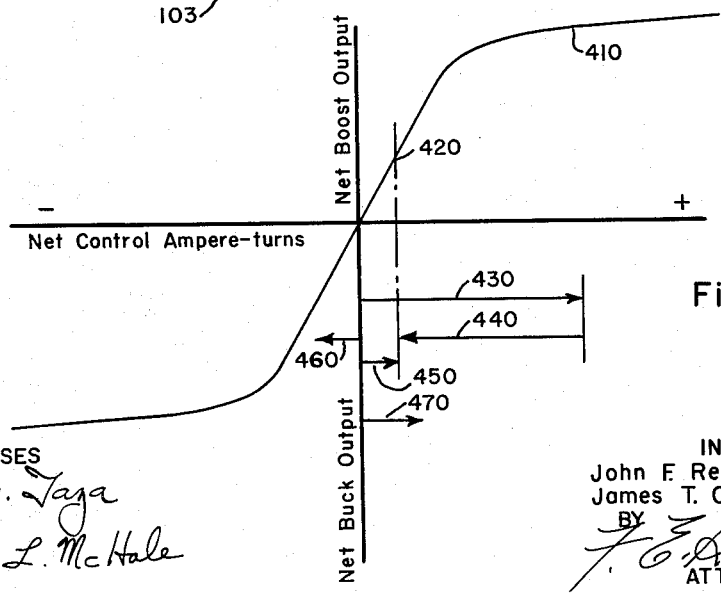
WITNESSES
INVENTORS
John F. Reuther and
James T. Carleton
BY
ATTORNEY United States Patent Office
3,001,123
Patented Sept. 19, 1961

3,001,123
ELECTRICAL CONTROL APPARATUS
John F. Reuther, Penn Hills Township, Allegheny County, and James T. Carleton, Forest Hills Borough, Pa., assignors to Westinghouse Electric Corporation, East Pittsburgh, Pa., a corporation of Pennsylvania
Filed June 25, 1959, Ser. No. 822,806
22 Claims. (Cl. 322—25)

This invention relates to electrical control apparatus and more particularly to auctioneering circuits used in electrical control apparatus, such as regulator systems.

In certain types of electrical control apparatus, such as the type which includes magnetic amplifiers, it is sometimes necessary to provide an auctioneering or control circuit in which the output is responsive to or varies with only the larger or the smaller of two input control signals. In conventional control or auctioneering circuits of the latter type, the comparison of the two input control signals is usually accomplished on the basis of the relative voltages of said control signals. In certain applications, the latter conventional method of comparing voltage of two control signals has certain disadvantages. For example, the difference between the voltages of the control signals may be so great that it is necessary to introduce additional amplification for one of the control signals before comparing their voltages. In addition, the introduction of additional amplification in certain types of electrical control apparatus, such as regulator systems, adversely affects the stability of the overall control apparatus. It is therefore desirable to provide an improved control of auctioneering circuit in which the output varies only with the larger or the smaller of two input control signals and in which the comparison of the control signals is accomplished on a current basis, rather than on a voltage basis.

It is an object of this invention to provide a new and improved electrical control apparatus for obtaining an output which varies only with the larger of two input control signals.

Another object of this invention is to provide an improved auctioneering circuit for obtaining an output which varies only with the larger of two input control currents.

A further object of the invention is to provide a new and improved limit circuit for use in electrical control apparatus, such as regulator systems.

Other objects of the invention will, in part, be obvious and will, in part, appear hereinafter.

For a fuller understanding of the nature and objects of the invention, reference should be had to the following detailed description taken in conjunction with the accompanying drawing, in which:

FIGURE 1 is a schematic diagram of one embodiment of our invention;

FIG. 2 is a partial schematic diagram of a second embodiment of our invention ;

FIG. 4 is a graph illustrating the transfer curve of the magnetic amplifier shown in FIG. 3.

Figure 3:
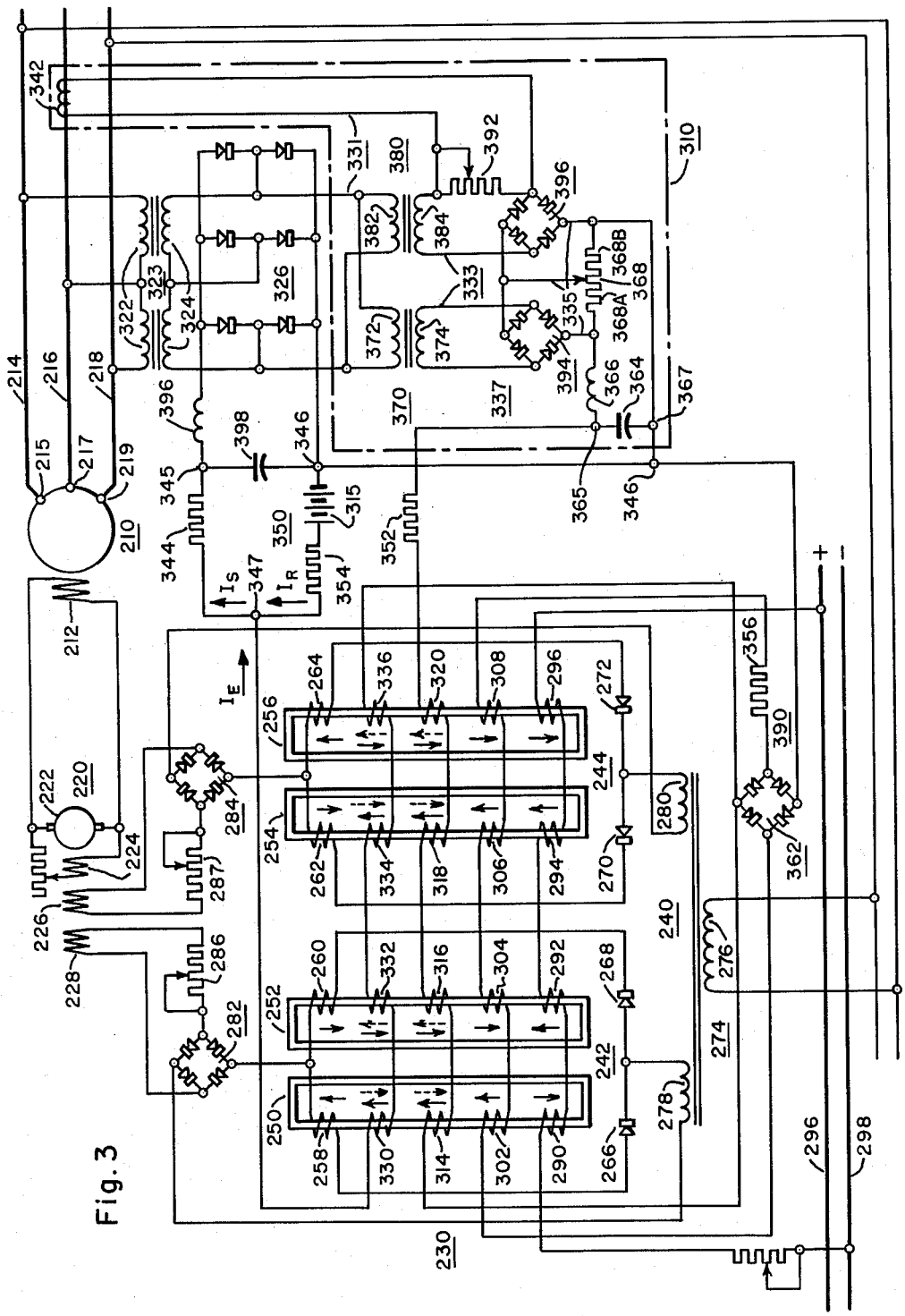
FIG. 3 is a schematic diagram of a third embodiment of our invention.

In general, the control or auctioneering circuit shown in FIG. 1 comprises a magnetic amplifier 60 and rectifier means including the rectifiers 92 and 96 which are connected in circuit relationship between a source of alternating current voltage 36 and a load circuit including a load 100 for applying to said load an output signal or voltage which varies with the larger of first and second unidirectional input control signals or currents $I_1$ and $I_2$, respectively, from the first and second signal sources 40 and 50, respectively.

As illustrated, the full wave, doubler type magnitic amplifier 60 comprises two magnetic core members 124 and 126. In this instance, the load windings 32 and 34 are disposed in inductive relationship with the magnetic core members 124 and 126, respectively. As is customary, self-saturation for the magnetic amplifier 60 is obtained by connecting in series circuit relationship with the load windings 32 and 34, the self-saturating rectifiers 62 and 64, respectively. In order to form a doubler circuit of the magnetic amplifier 60, the series circuit including the load winding 32 and the self-saturating rectifier 62 is connected in parallel circuit relationship with the series circuit including the load winding 34 and the self-saturating rectifier 64.

Energy for the load windings 32 and 34 of the magnetic amplifier 60 is received from a transformer 70 having a primary winding 84, which in this instance is responsive to the output voltage of the alternating current source 36, and a secondary winding 82. As illustrated, a full wave dry-type load rectifier 92 is interconnected with the hereinbefore described parallel circuit of the magnetic amplifier 60 and with the secondary winding 82 of the transformer 70 in order to produce a direct-current output for the magnetic amplifier 60 at the output terminals 110 and 112 which are connected to a load circuit which includes the load 100.

For the purpose of biasing the magnetic amplifier 60 by a predetermined amount, the bias windings 76 and 78 are disposed in inductive relationship with the magnetic core members 124 and 126, respectively. In particular, the bias windings 76 and 78 are connected in series circuit relationship with one another, the series circuit being connected through an adjusting rheostat 86 to the conductors 102 and 104 which have applied thereto a substantially constant direct-current voltage. In operation, the current flow through the bias windings 76 and 78 produces a magnetomotive force or ampere-turns with respect to their respective magnetic core members that opposes the magnetomotive force or ampere-turns produced by the current flow through the load windings 32 and 34, respectively.

In order to render the magnetic amplifier 60 responsive to the first unidirectional or direct-current input control signal or current $I_1$ from the first signal source 40 at the input terminals 42 and 44, a first set of control windings 46 and 48 is disposed in inductive relationship with the magnetic core members 124 and 126, respectively. In particular, the first control windings 46 and 48 are connected in series circuit relationship with one another, the series circuit being connected between the input terminal 42 of the first signal source 40 and the upper input terminal 101 of the rectifier means 96.

In order to render the magnetic amplifier 60 responsive to the second unidirectional or direct-current input control signal or current $I_2$ from the second signal source 50 at the input terminals 52 and 54, a second set of control windings 56 and 58 is disposed in inductive relationship with the magnetic core members 124 and 126, respectively. In particular, the second control windings 56 and 58 are connected in series circuit relationship with one another, the series circuit being connected between the input terminal 52 of the second signal source 50 and the upper input terminal 101 of the rectifier means 96. It is to be noted that the first set of control windings 46 and 48 is connected in series circuit relationship with the second set of control windings 56 and 58 between the input terminal 42 of the first signal source 40 and the input terminal 52 of the second signal source 50 with the common terminal between said first and second sets of control windings being the upper input terminal 101 of the rectifier means 96. The lower input terminal 44 of the first signal source 40 and the lower input terminal 54 of the second signal source 50 are both connected to a common junction point, which is the lower input terminal 103 of the rectifier means 96, for reasons which will be explained hereinafter.

The first control windings 46 and 48 of the magnetic amplifier 60 are so disposed on their respective magnetic core members 124 and 126 that when the first input control signal or current $I_1$ from the first signal source 40 flows therethrough in the direction indicated in FIG. 1, a magnetomotive force is produced in the respective magnetic core members, that is additive with respect to the magnetomotive force or ampere-turns produced by the current flow through the respective load windings 32 and 34, as also indicated in FIG. 1. Similarly, the second control windings 56 and 58 of the magnetic amplifier 60 are so disposed on their respective magnetic core members 124 and 126 that when the second input control signal or current $I_2$ from the second signal source 50 flows therethrough in the direction indicated in FIG. 1, a magnetomotive force is produced in the respective magnetic core members that is also additive with respect to the magnetomotive force or ampere-turns produced by the current flow through the respective load windings 32 and 34.

If it is assumed as a reference direction, that the direction of an input control signal or current is positive when the ampere-turns or magnetomotive force produced by the flow of said input signal or current in the associated control windings is additive with respect to the magnetomotive force or ampere-turns produced by the flow of current through the respective load windings 32 and 34 thus tending to drive the magnetic core members 124 and 126 towards saturation and increasing the output signal of the magnetic amplifier 60, then the directions of the first and second input control signals or currents $I_1$ and $I_2$, respectively, would both be positive with respect to the assumed reference direction. On the other hand, if the directions of the input control signals or currents applied to the first control windings 46 and 48 and to the second control windings 56 and 58 were opposite to the assumed reference direction, which would also be opposite in direction to the directions of the first and second input control signals or currents $I_1$ and $I_2$, respectively, shown in FIG. 1, then the direction of such input control signals or currents would be negative with respect to the assumed reference direction thus tending to drive the magnetic core members 124 and 126 away from saturation and decreasing the output signal of the magnetic amplifier 60.

In order to render the magnetic amplifier 60 responsive to the absolute magnitude of the algebraic difference between the first and second input control signals or currents $I_1$ and $I_2$, respectively, a third set of control windings 72 and 74 is disposed in inductive relationship with the magnetic core members 124 and 126, respectively. In particular, the third control windings 72 and 74 are connected in series circuit relationship with each other, the series circuit being connected through a resistor 88 across the output terminals 105 and 107 of the full-wave, bridge type rectifier 96 whose input terminals are connected to the common junction point between the first control windings 46 and 48 and the second control windings 56 and 58, as indicated at the terminal 101, and to the common junction point between the first and second signal sources 40 and 50, respectively, as indicated at the terminal 103. In operation, the full wave rectifier 96 applies a difference signal or current $I_D$ to the third control windings 72 and 74 which varies with the absolute magnitude of the algebraic difference between the first and second input control signals $I_1$ and $I_2$, respectively, the direction of the difference signal or current $I_D$ being always in a positive direction with respect to the assumed reference direction previously discussed because of the manner in which the full wave rectifier 96 is connected in circuit relation with the control windings of the magnetic amplifier 60. The resistor 88 prevents the third control windings 72 and 74 from being short circuited by the rectifiers in the full wave rectifier 96 and improves the speed of response of the magnetic amplifier 60. The capacitor 94 is connected in parallel circuit relationship with the series circuit which includes the third control windings 72 and 74 and the resistor 88 in order to reduce the effect of harmonics which might be generated in the third control windings 72 and 74.

The third control windings 72 and 74 are so disposed on their respective magnetic core members 124 and 126 that when the difference signal or current $I_D$ flows therethrough in the direction indicated in FIG. 1, as determined by the full wave rectifier 96, a magnetomotive force is produced in the respective magnetic core members that is additive with respect to the magnetomotive force or ampere-turns produced by the current flow through the respective load windings 32 and 34. For reasons which will be discussed hereinafter, the number of turns in the third control windings 72 and 74 is substantially equal to the number of turns in the first control windings 46 and 48 and to the number of turns in the second control windings 56 and 58.

In the operation of the control or auctioneering circuit shown in FIG. 1, the output signal of voltage of the magnetic amplifier 60 which appears at the output terminals 110 and 112 is responsive to or varies with the algebraic sum or net total of the ampere-turns or magnetomotive forces produced by the flow of the first and second input control signals or currents $I_1$ and $I_2$, respectively, in the first control windings 46 and 48 and in the second control windings 56 and 58, respectively, and by the flow of the difference signal or current $I_D$ in the third control windings 72 and 74. The sum or net total of the ampere-turns produced by the flow of control signals or currents in the first, second and third control windings of the magnetic amplifier 60 in turn varies with or is responsive to only the algebraically larger of the first and second input control signals $I_1$ and $I_2$. In other words, the output of the magnetic amplifier 60 varies with only the more positive, with respect to the assumed reference direction previously mentioned, or less negative of the first and second input control signals $I_1$ and $I_2$, respectively.

For example, assuming that during operation, the directions of the first and second input control signals or currents $I_1$ and $I_2$, respectively, are as shown in FIG. 1 and both are positive with respect to the assumed reference direction, but that the magnitude of the first input control signal or current $I_1$ is algebraically larger or exceeds the magnitude of the second input control signal or current $I_2$, then a difference signal or current $I_D$ will flow in the direction indicated in FIG. 1 from the upper input terminal 101 of the rectifier 96 through one of the rectifiers of the rectifier 96 to the terminal 105 and then through the third control winding 72 and 74 to the terminal 107 of the rectifier 96 and back to the other input terminal 103 of the rectifier 96 through a rectifier leg of the rectifier 96. As mentioned previously, the magnitude of the difference signal or current $I_D$ will be equal to the absolute magnitude of the algebraic difference between the first and second input control signals $I_1$ and $I_2$, respectively. Assuming that the number of turns in each of the first, second and third control windings of the magnetic amplifier 60 is substantially equal to N, the algebraic sum or net total of the ampere-turns produced by the flow of the respective control currents in the first, second and third control windings of the magnetic amplifier 60 may be expressed by the following equation:

(1) $$NI_1 + NI_2 + N(I_1 - I_2) = 2NI_1$$

As shown by Equation 1, the sum or net total of the ampere-turns produced by the flow of the respective control currents in the first, second and third control windings of the magnetic amplifier 60 during the assumed operating condition is substantially equal to twice the number of turns in each of said control windings times the algebraically larger assumed control signal or current $I_1$.

On the other hand, assuming that the directions of the first and second input control signals $I_1$ and $I_2$, respectively, are as shown in FIG. 1 and are both in a positive direction with respect to the assumed reference direction, but that the magnitude of the second input control current or signal $I_2$ is algebraically larger or exceeds the magnitude of the first input control signal or current $I_1$, then a difference signal or current $I_D$ will flow from the lower input terminal 103 of the rectifier 96 through one of the rectifiers of the rectifier 96 to the terminal 105 and then to the third control windings 72 and 74, to the terminal 107 of the rectifier 96, and then to the upper input terminal 101 of the rectifier 96 through one of the rectifier legs of the rectifier means 96. Because of the operation of the rectifier means 96, the direction of the difference signal or current $I_D$ is the same as previously discussed for the first assumed operating condition and the magnitude of said difference signal or current is again equal to the absolute magnitude of the algebraic difference between the second input control signal $I_2$ and the first input control signal or current $I_1$. When the second input control signal $I_2$ is algebraically larger or more positive than the first input control signal or current $I_1$, the sum or net total of the ampere-turns produced by the flow of the respective control currents in the first, second and third control windings of the magnetic amplifier 60 during the assumed operating condition may be expressed by the following equation:

(2) $\quad NI_1 + NI_2 + N(I_2 - I_1) = 2NI_2$

As shown by Equation 2, the sum or net total of the ampere-turns produced by the flow of the respective control currents in the respective control windings of the magnetic amplifier 60 when the second input control signal or current $I_2$ is algebraically larger than the first input control signal or current $I_1$ varies with or is responsive to twice the number of turns of each of said control windings times the algebraically larger second input control signal or current $I_2$.

In summary, the output signal or voltage of the magnetic amplifier 60 varies with or is responsive to only the algebraically larger or more positive with respect to assumed reference direction of the first and second input control signals or currents $I_1$ and $I_2$, respectively. The latter operating characteristic of the control or auctioneering circuit shown in FIG. 1 holds true even though one or both of the two input control signals or currents reverses with respect to an assumed reference direction or becomes negative with respect to the latter assumed reference direction. If only one of the two input control signals is negative with respect to the assumed reference direction, then the output of the magnetic amplifier 60 will vary with only the more positive of said input control signals. If both of the input control signals become negative with respect to the assumed reference direction, then the output of magnetic amplifier 60 will vary with only the algebraically less negative of the two input control signals. It will be readily understood that the manner in which the third control windings 72 and 74 are disposed on the magnetic core members 124 and 126, respectively, of the magnetic amplifier 60 may be readily modified or reversed in certain applications in order that the output of the magnetic amplifier 60 in such applications will vary only with the algebraically smaller or more negative of two input control signals, that is, in accordance with the input control signal which is either less positive or more negative.

It is to be noted that the ampere-turns produced by the flow of the first and second input control signals $I_1$ and $I_2$, respectively, in the first control windings 46 and 48 and in the second control windings 56 and 58, respectively, of the magnetic amplifier 60 taken together varies with the algebraic sum of said first and second input control signals or currents while the ampere-turns of the third control windings 72 and 74 of the magnetic amplifier 60 varies with the algebraic difference between said first and second input control signals or currents. The summing of the first and second input control signals or currents $I_1$ and $I_2$, respectively, is accomplished magnetically and is isolated electrically from the third control windings 72 and 74 in which the difference between said input control signals is obtained by the use of the full wave rectifier means 96.

Referring now to FIG. 2, there is shown a control or auctioneering circuit illustrating a second embodiment of the invention. The control or auctioneering circuit shown in FIG. 2 is similar to the auctioneering circuit shown in FIG. 1 except for the changes indicated by the partial schematic diagram shown in FIG. 2. In particular, the control auctioneering circuit shown in FIG. 2 is similar to the auctioneering circuit shown in FIG. 1 that the full wave rectifier 96, the third control windings 72 and 74, the capacitor 94 and the resistor 88 are omitted from the circuit shown in FIG. 1, and the windings, the rectifiers and the resistors shown in the partial schematic of FIG. 2 will be connected or substituted between the terminals 101 and 103 as shown in FIG. 2. The balance of the auctioneering circuit shown in FIG. 2 would be the same as previously described for the auctioneering circuit of FIG. 1.

In general, the magnetic amplifier 60' which is shown in partial schematic form in FIG. 2 requires more control windings than the magnetic amplifier 60 shown in FIG. 1 but requires less rectifiers in association therewith. The load windings, the bias windings, the first control windings and the second control windings of the magnetic amplifier 60' would be identical with those previously described for the magnetic amplifier 60.

In order to render the magnetic amplifier 60' responsive to the difference signal or current when a first input control signal or current is algebraically larger than a second input control signal or current, the third control windings 156 and 158 are disposed in inductive relationship with the magnetic core members 124 and 126 respectively. The third control windings 156 and 158 are connected in series circuit relationship with one another, the series circuit being connected between the terminal 101 through a first associated rectifier 198 and the terminal 103 through a resistor 188. The third control windings 156 and 158 are so disposed on the respective magnetic core members 124 and 126 that when a difference signal or current flows from the terminal 101 through the rectifier 198 and the third control windings 156 and 158, the ampere-turns or magnetomotive force produced in the respective magnetic core members is additive with respect to the ampere-turns or magnetomotive force produced in the respective core members by the current flow to the respective load windings of the magnetic amplifier 60'.

In order to render the magnetic amplifier 60' responsive to a difference signal or current when the second input signal or current is larger than the first input signal or current just mentioned, the fourth control windings 166 and 168 are disposed in inductive relationship with the magnetic core members 124 and 126, respectively. The fourth control windings 166 and 168 of the magnetic amplifier 60' are connected in series circuit relationship with one another, the series circuit being connected between the terminal 101 through a second associated rectifier 196 and the terminal 103 through a resistor 186. The fourth control windings 166 and 168 of the magnetic amplifier 60' are so disposed on the respective magnetic core members 124 and 126 that when a difference signal or current flows from the terminal 103 through the resistor 188, the fourth control windings 166 and 168 and the rectifier 196 to the terminal 101 the ampere-turns or magnetomotive force produced in the respective core members thereby is additive with respect to the ampere-turns or magnetomotive force produced in the respective magnetic core members by the current flow in the respective load windings of the magnetic amplifier 60'.

In general, the operation of the control or auctioneering circuit shown in FIG. 2 is siimlar to the operation of the current control or auctioneering circuit shown in FIG. 1 as previously discussed. The number of windings required in the magnetic amplifier 60' is increased since a difference signal or current flows in only one direction through each of the first and second rectifiers 196 and 198, respectively, of the auctioneering circuit shown in FIG. 2, as well as in the associated control windings 156 and 158 and 166 and 168, respectively, rather than flowing in both directions through said rectifiers, as does the current through the full wave rectifier 96 of the auctioneering circuit shown in FIG. 1. The overall operation of the auctioneering circuit shown in FIG. 2 would be the same as previously described for the auctioneering circuit shown in FIG. 1 since the output of the magnetic amplifier 60' will vary with only the algebraically larger of two input control signals or currents or in accordance with the more positive or less negative of two input control signals or currents as previously described in detail for the auctioneering circuit shown in FIG. 1. The circuit of FIG. 2 may be modified similarly to the circuit of FIG. 1, as previously mentioned, to be responsive to only the algebraically smaller or more negative of two input control signals or currents.

Referring now to FIG. 3 there is illustrated a dynamoelectric machine, more specifically a synchronous generator 210, having an excitation field winding 212 and the output terminals 215, 217 and 219. In this instance, the generator 210 is disposed to supply energy or electric power to the line conductors 214, 216 and 218 which are part of a three-phase electrical system or circuit. In order to obtain an excitation voltage across the field winding 212 of relatively larger magnitude, an exciter 220 is provided. In this instance, the exciter 220 comprises an armature 222 which supplies current to the field winding 212 of the generator 210, a self-exciting field winding 224 and the buck and boost excitation field winding 226 and 228, respectively, the purpose of which will be explained hereinafter. In order to maintain the output voltage of the generator 10, at substantially a predetermined value, a regulator loop or system 230, comprising an error detecting circuit 350 for obtaining an error signal or current which varies with the deviation of the output voltage of the generator 210 from its regulated value and a push-pull magnetic amplifier 240, is interconnected between the output of the generator 210 and the buck and boost field windings 226 and 228, respectively, of the exciter 220.

A minimum excitation limit circuit 310 is connected to the output of the generator 10 for obtaining a limiting signal which varies with the stability limits of the generator 210 and cooperates with the push-pull magnetic amplifier 240 of the regulator loop or system 230 to prevent the generator 210 from falling out of step or synchronism during certain operating conditions. In addition, an auctioneering circuit comprising the full wave rectifier 362 and the control windings of the push-pull magnetic amplifier 240 is connected in circuit relation with the error detecting circuit 350 and the minimum excitation limit circuit 310 in order that the net output of the magnetic amplifier 240, and in turn the regulator system 230, respond to or vary only with the algebraically larger of either the error signal from the error detecting circuit 350 or the limiting signal from the minimum excitation limit circuit 310.

As hereinbefore mentioned, the regulator loop 230 is provided in order to maintain the magnitude of the output voltage of the generator 210 at substantially a predetermined value. For purposes of clarity, the components and operation of the regulator loop or system 230 will be described before describing the various components and operation of the minimum excitation limit circuit 310 and the effect of the latter operation on the operation of the regulator loop 230.

In general, the error detecting circuit 350 is connected in circuit relation with the output terminals 215, 217 and 219 of the generator 210 for obtaining a unidirectional output signal or current which varies with the deviation of the output voltage of said generator from a predetermined, desired regulated value. In particular, the error detecting circuit 350 comprises a three-phase full wave rectifier 326 and a constant potential or voltage reference device 315 which produces at its output a substantially constant unidirectional or direct-current output voltage. The input terminals of the full wave rectifier 326 are connected across the secondary windings 324 of the potential transformers 323 whose primary windings 322 are connected across the output terminals 215, 217 and 219 of the generator 210 through the line conductors 214, 216 and 218, respectively, to be responsive to the output voltage of said generator. A filter circuit including a linear filter reactor 396 and a capacitor 398 is interconnected between the output terminals of the full wave rectifier 326 and the terminals 345 and 346 in order to produce a smooth direct-current voltage across the latter terminals which varies with the output voltage of the generator 210. A relatively high impedance, more specifically the resistor 344, is connected between the terminal 345 and the terminal 347 for providing at the output terminals 346 and 347 of the error detecting circuit 350 an output signal or current which varies with the output voltage of the generator 210. In order to provide at the output terminals 346 and 347 of the error detecting circuit 350 an output signal or current which remains substantially constant independently of variations in the output voltage of the generator 10 and which opposes the output signal or current of the full wave rectifier 326, the series circuit which includes the relatively high impedance more specifically the resistor 354 and the constant potential or voltage reference device 315 is connected between the output terminals 346 and 347 of the error detecting circuit 350. The net output signal or current of the error detecting circuit 350 which appears at the output terminal 346 and 347 is the difference between the output signals or currents of the full wave rectifier 326 and the voltage reference device 315 and is a measure of the deviation of the output voltage of the generator 210 from the predetermined desired regulated value. The direction of the unidirectional output signal or current which appears at the output terminals 346 and 347 of the error detecting circuit 350 depends upon whether the output signal or current from the full wave rectifier 326 is larger or smaller than the substantially constant unidirectional output current or signal from the voltage reference device 315.

As illustrated, the push-pull magnetic amplifier 240 comprises two main sections 242 and 244. Each of the sections 242 and 244 of the magnetic amplifier 240 is similar to the magnetic amplifier 60 of the auctioneering circuit shown in FIG. 1. The section 242 comprises two magnetic core members 250 and 252 and the section 244 comprises two magnetic core members 254 and 256. In this instance, the load windings 258, 260, 262 and 264 are disposed in inductive relationship with the magnetic core members 250, 252, 254 and 256, respectively. As is customary, self-saturation for the magnetic amplifier 240 is obtained by connecting in series circuit relationship with the load windings 258, 260, 262 and 264, the self-saturating rectifiers 266, 268, 270 and 272, respectively. In order to form a doubler circuit of the section 242, the series circuit including the load winding 258 and the self-saturating rectifier 266 is connected in parallel circuit relationship with the series circuit including the load winding 260 and the self-saturating rectifier 268. In like manner, in order to form a doubler circuit of the section 244, the series circuit including the load winding 262 and the self-saturating rectifier 270 is connected in parallel circuit relationship with the series circuit including the load winding 264 and the self-saturating rectifier 272.

Energy for the load windings 258, 260, 262 and 264 of the magnetic amplifier 240 is received from a transformer 274 having a primary winding 276 which is responsive to the output voltage of the generator 210 at the line conductors 214 and 218 as illustrated in this instance. As illustrated, a full wave dry type load rectifier 282 is interconnected with the hereinbefore described parallel circuit of the section 242 and with the secondary winding section 278 of the transformer 274 in order to produce a unidirectional or direct-current output for the section 242. In like manner, a full wave, dry type load rectifier 284 is interconnected with the hereinbefore described parallel circuit of the section 244 and with the secondary winding section 280 of the transformer 274 in order to obtain a unidirectional or direct-current output for the section 244.

In this instance, the boost field winding 228 of the exciter 220 is responsive to the output of the load rectifier 282 of the section 242 and the buck field winding 226 of the exciter 220 is responsive to the output of the load rectifier 284 of the section 244. In operation, the buck field winding opposes the boost field winding 228. In order to provide means for changing the gain in the regulator loop or system 230, the variable resistors 286 and 287 are connected in series circuit relationship with the boost field winding 228 and with the buck field winding 226, respectively.

For the purpose of biasing each of these sections 242 and 244 of the magnetic amplifier 240 by a predetermined amount, the bias windings 290, 292, 294 and 296 are disposed in inductive relationship with the magnetic core members 250, 252, 254 and 256, respectively. In particular, the bias windings 290, 292, 294 and 296 are connected in series circuit relationship with one another, the series circuit being connected to the conductors 296 and 298 which have applied thereto a substantially constant unidirectional or direct-current voltage. In operation, the current flow through the bias windings 290, 292, 294 and 296 produces ampere-turns or a magnetomotive force with respect to their respective magnetic core members that opposes the ampere-turns or magnetomotive force produced by the current flow through the load windings 258, 260, 262 and 264, respectively.

In order to render the magnetic amplifier 240 responsive to the output error signal or current from the error detecting circuit 350, a first set of control windings 330, 332, 334 and 336 is disposed in inductive relationship with the magnetic core members 250, 252, 254 and 256, respectively. The first control windings 330, 332, 334 and 336 are connected in series circuit relationship with one another, the series circuit being connected between the output terminal 347 of the error detecting circuit 350 and the upper input terminal of the full wave rectifier 362, whose purpose will be discussed hereinafter. The lower input terminal of the rectifier 362 is connected to the other output terminal 346 of the error detecting circuit 350. The first control windings 330, 332, 334 and 336 are so disposed on their respective magnetic core members 250, 252, 254, and 256 that when current flows therethrough, the magnetomotive force or ampere-turns produced thereby in the respective magnetic core members opposes or is additive with respect to the magnetomotive force or ampere turns produced by the current flow through the respective load windings 258, 260, 262 and 264 depending upon whether the output current of the full wave rectifier 326 is larger or smaller than the output current of the voltage reference device 315. When the output signal or current from the full wave rectifier 326 which is a measure of the output voltage of the generator 210 is larger than the output signal or current of the voltage reference device 315, the direction of the magnetomotive forces produced by the flow of the net error signal or current from the error detecting circuit 350 in the first control windings 330, 332, 334 and 336 of the magnetic amplifier 240 is indicated by the solid arrows in FIG. 3. When the output signal or current from the full wave rectifier 326 is less than the output signal or current from the voltage reference device 315, the direction of the magnetomotive forces or ampere-turns produced in their respective magnetic core members in the magnetic amplifier 240 by the flow of the net error or signal current from the error detecting circuit 350 in the first control windings 330, 332, 334 and 336 is indicated by the dotted arrows in FIG. 3.

In order to render the magnetic amplifier 240 responsive to the limit signal from the minimum excitation limit circuit 310 during certain operating conditions, as will be explained in detail hereinafter, the limit windings or second control windings 314, 316, 318 and 320 are disposed in inductive relationship with the magnetic core members 250, 252, 254 and 256, respectively. The second control windings 314, 316, 318 and 320 are connected in series circuit relationship with one another, the series circuit being connected between the output terminal 365 of the minimum excitation limit circuit 310 through a relatively high impedance, more specifically, the resistor 352, and the upper input terminal of the full wave rectifier 362. The lower input terminal of the full wave rectifier 362, which is connected to the output terminal 346 of the error detecting circuit 350, is also connected to the other output terminal 367 of the minimum excitation limit circuit 310. The second control windings 314, 316, 318 and 320 are so disposed on their respective magnetic core members 250, 252, 254 and 256 that when current flows therethrough, the magnetomotive force or ampere-turns produced thereby in the respective magnetic core members either opposes or is additive with respect to the ampere-turns or magnetomotive force produced by the current flow through the respective load windings 258, 260, 262, and 264 depending upon the direction of the output limit signal or current from the minimum excitation limit circuit 310 which appears at the output terminals 365 and 367 of said limit circuit.

In order to render the magnetic amplifier 240 responsive to only the algebraically larger of the output signals from the error detecting circuit 350 and the minimum excitation limit 310, an auctioneering circuit 390 is provided which includes the first control windings 330, 332, 334, 336, the second control windings 314, 316, 318 and 320 and the third control winding 302, 304, 306 and 308 of the magnetic amplifier 240, the full wave rectifier 362 and the resistor 356. The lower input terminal of the full wave rectifier 362 is connected to the output terminal 346 of the error detecting circuit 350 and to the output terminal 367 of the minimum excitation limit circuit 310, as previously mentioned. The first control winding 330, 332, 334 and 336 and the second control windings 314, 316, 318 and 320 of the magnetic amplifier 240 are connected in series circuit relationship with each other between the output terminal 347 of the error detecting circuit 350 and the output terminal 365 of the minimum excitation limit circuit 310 through the resistor 352 with the common terminal between said first and second control windings being connected to the upper input terminal of the full wave rectifier 362.

The third control windings 302, 304, 306 and 308 of the magnetic amplifier 240 are connected in series circuit relationship with one another, the series circuit being connected through the resistor 356 across the output terminals of the full wave rectifier 362. The third control windings 302, 304, 306 and 308 are disposed in inductive relationship with the magnetic core members 250, 252, 254 and 256, respectively. During operation, the current which flows in the third control windings 302, 304, 306 and 308 of the magnetic amplifier 240 is the difference between the error signal or current from the error detecting circuit 350 and the limit signal or current from the minimum excitation limit circuit 310 and varies with the absolute magnitude of the algebraic difference between said error signal and said limit signal. The third control windings 302, 304, 306 and 308 are so disposed on their respective magnetic core members 250, 252, 254 and 256 that when current flows therethrough, the magnetomotive force or ampere-turns produced thereby in the magnetic core members 250 and 252, respectively, is additive with respect to the ampere-turns or magnetomotive force produced by the current flow through the respective load windings 258 and 260 and the magnetomotive force or ampere-turns produced thereby in the magnetic core members 254 and 256, respectively, opposes the magnetomotive force or ampere-turns produced by the current flow through the respective load windings 262 and 264.

Similarly to the output of the magnetic amplifier 60 as previously described in detail, the net or total output of the magnetic amplifier 240, as measured by the relative outputs of the sections 242 and 244 in the buck and boost field windings 228 and 226, respectively, varies with only the algebraically larger of the control signals or currents from the error detecting circuit 350 and the minimum excitation limit circuit 310. It will be assumed as a reference direction that the direction of a control signal or current is positive when the flow of said control signal or current in the associated control windings of the magnetic amplifier 240 tends to increase the output of the section 242 and tends to decrease the output of the section 244. In other words, the net or total output of the magnetic amplifier 240 varies with only the more positive or less negative of the control signals from the error detecting circuit 350 and the minimum excitation limit circuit 310 with respect to the assumed reference direction. For example, the direction of the error signal or current whose flow in the first control windings 330, 332, 334 and 336 of the magnetic amplifier 240 produces the magnetomotive forces indicated by the solid arrows in FIG. 3 will be considered positive while the direction of the error signal or current whose flow in said first control windings produces the magnetomotive forces indicated by the dotted arrows in FIG. 3 will be considered negative.

Referring to FIG. 4, the operation of the regulator loop or system 230 will be described during normal operating conditions when the output error signal from the error detecting circuit 350 is algebraically larger or more positive than the output limit signal from the minimum excitation limit circuit 310, and said regulator system is responding only to said error signal. In particular, there is shown in FIG. 4 a transfer characteristic curve 410 for the magnetic amplifier 240 which illustrates the manner in which the net average output of the magnetic amplifier 240 which is applied to the buck and boost field windings 228 and 226, respectively, of the exciter 220 varies with changes in the magnitude of the net control ampere-turns as produced by the current flow through the first, second and third control windings of said magnetic amplifier. In FIG. 4, a vector 430 represents the control ampere-turns produced by the output current from the voltage reference device 315 flowing through the first control windings 330, 332, 334 and 336 of the magnetic amplifier 240. Since the effective current flow through the first control windings 330 through 336 of the magnetic amplifier 240 from the voltage reference device 315 remains substantially constant during the operation of the regulator system 230, the magnitude of the vector 430 remains substantially unchanged. The vector 440 represents the control ampere-turns produced by the output current or signal from the error detecting circuit 350 flowing through the first control windings 330, 332, 334 and 336 of the magnetic amplifier 240 when the output voltage of the generator 210 is substantially at the predetermined regulated value. The magnitude of the vector 440 varies in accordance with the output current from the full wave rectifier 326 and thus in accordance with the output voltage of the generator 210. The vector 450 is the vector difference between the vectors 430 and 440 and therefore represents the net error signal or current which flows in the first control windings 330 through 336 of the magnetic amplifier 240. Similarly to the vector 440, the magnitude of the vector 450 varies with the output voltage of the generator 210 and direction of the vector 450 may reverse during operation when the output voltage of the generator 210 falls below the predetermined regulated value of output voltage. The normal operating point of the regulator system 230, as indicated at 420 in FIG. 4, at which the output voltage of the generator 210 is maintained at substantially the regulated value can therefore be arranged to correspond to a particular error signal or current, as indicated by the vector 450. The vector 460 represents the output limit signal from the minimum excitation limit circuit 310 during normal operating conditions when the error signal, as indicated by the vector 450, is algebraically larger or more positive than the limit signal, as indicated by the vector 460, and when the regulator system 230 is responding only to the error signal from the error detecting circuit 350.

During the normal operation of the regulator system 230 when said regulator system is responding only to the error signal from the error detecting circuit 350 and the output voltage of the generator 210 increases to a value above its regulated value, the current flow from the error detecting circuit 350 through the first control windings 330 through 336 of the magnetic amplifier 240 decreases or reverses and then increases in the opposite direction to thereby decrease the output current from the section 242 of the amplifier 240 and increase the output current from the section 244 of the push-pull magnetic amplifier 240. Such an action increases the current flow through the buck field winding 226 of the exciter 220 and decreases the current flow through the boost field winding 228 to thereby decrease the output voltage of the exciter 220. A decrease in the output voltage of the exciter 220 decreases the magnitude of the voltage across the field winding 212 of the generator 210 to thereby return the output voltage of the generator 210 to its predetermined regulated value.

On the other hand, a decrease in the output voltage of the generator 210 to a value below its regulated value increases the magnitude of the net current flow from the error detecting circuit 350 through the first control windings 330 through 336 of the magnetic amplifier 240 in a direction which is positive with respect to the assumed reference direction. An increase in the current flow through the first control winding 330 through 336 of the magnetic amplifier 240 in the latter direction unbalances said magnetic amplifier in such a direction that the output current from the section 242 of said amplifier increases and the output current from the section 244 decreases. Such an action increases the magnitude of the current flow through the boost field winding 228 of the exciter 220 and decreases the magnitude of the current flow from the buck field winding 226. This, in turn, increases the magnitude of the output voltage of the exciter 220 as well as the magnitude of the voltage across the field winding 212 of the exciter 210 to thereby return the magnitude of the output voltage of the generator 210 to substantially its regulated value.

The minimum excitation limit circuit 310 is of the same general type which is disclosed in U.S. Patent 2,862,172 which was issued on an application of J. T. Carleton et al. and assigned to the same assignee as the present application. Briefly, the minimum excitation limit circuit 310 comprises a sensing circuit 337, which includes two full-wave, dry-type rectifier units 394 and 396, each having input and output terminals; an inpedance circuit 331 connected through the transformers 323 to the electrical circuit, which includes the line conductors 214, 216 and 218, to be energized by a measure of the current flowing in the electrical circuit and by a measure of the voltage in said electrical circuit; circuit means 333 connected to the impedance circuit 331 for applying to the input terminals of both of the rectifier units 394 and 396 a voltage proportional to the measure of the voltage in said electrical circuit, the measure of the voltage in said electrical circuit, including the conductors 214 and 218, that is applied to the rectifier 394 being of substantially greater magnitude than the measure of the voltage in the electrical circuit that is applied to the rectifier 396, and for applying to the input terminals of the rectifier 396 a voltage proportional to the measure of the current flowing in the electrical circuit, which includes the line conductors 214, 216 and 218; and an electrical network 335 connected to the output terminals of the rectifiers 394 and 396 for producing at its output a unidirectional or direct-current voltage that is a measure of the difference in the output voltages of the two rectifiers 394 and 396.

More specifically, the impedance circuit 331 comprises the potential transformers 370 and 380 having the secondary windings 374 and 384, respectively, and the primary windings 372 and 382, respectively, connected to be responsive to the voltage across two phases of the three-phase electrical circuit which includes the line conductors 214, 216 and 218; and an impedance member, more specifically a variable resistor 392, responsive to a measure of the current flowing in the remaining phase of the three-phase electrical circuit, including the line conductors 214, 216 and 218. In order to obtain the proper magnitude of voltage across the primary windings 372 and 382 of the transformers 370 and 380, respectively, the potential transformers 323 are interconnected between the primary windings 372 and 382 of the transformers 370 and 380, respectively, and the line conductors 214, 216 and 218. In like manner, in order to obtain the proper magnitude of voltage across the variable resistor 392, a current transformer 342 is disposed to be responsive to the magnitude of the current flow through the line conductor 216. In order to apply a voltage to the input terminals of the rectifier 394 that is a measure of the terminal voltage of the generator 210, the secondary winding 374 of the potential transformer 370 is connected to the input terminals of the rectifier 394. On the other hand, in order to apply to the input terminals of the rectifier 396, a voltage proportional to the vector sum of the voltages across the variable resistor 392 and the secondary winding 384 of the potential transformer 380, the variable resistor 392 and the secondary winding 384 are connected in series circuit relationship with one another, the series circuit being connected to the input terminals of the rectifiers 396. The voltage across the secondary winding 384 is likewise proportional to or varies with the terminal voltage of the generator 210. The voltage, however, across the secondary winding 374 is always of substantially greater magnitude than the voltage across the secondary winding 384 of the potential transformer 380. The voltage across the variable resistor 392 varies in accordance with the magnitude of the current flow through the line conductor 216.

In this instance, the electrical network 335 comprises a potentiometer including two resistor sections 368A and 368B. The resistor section 368A is connected to the output terminals of the rectifier 394 and the resistor section 368B is connected to the output terminals of the rectifier 396, the resistor sections 368A and 368B being connected in series circuit relationship with one another so that the net voltage across the resistor sections 368A and 368B is proportional to the difference in the specific voltages appearing across each of said resistor sections. A filter circuit which includes a linear filter reactor 366 and a capacitor 364 is interconnected between the resistor sections 368A and 368B and the output terminals 365 and 367 of the minimum excitation circuit 310 for smoothing the unidirectional or direct-current output voltage of said minimum excitation limit circuit.

During the operation of the minimum excitation limit circuit 310, as explained in greater detail in U.S. Patent 2,862,172, previously mentioned, the output limit signal which appears at the output terminals 365 and 367 of the minimum excitation limit circuit 310 and which is applied to the limit windings 314 through 320 of the magnetic amplifier 240 follows the pull-out characteristic of the generator 210. When the apparatus shown in FIG. 3 is operating within the minimum excitation limit and the net voltage across the resistor sections 368A and 368B is of a polarity which is positive at the terminal 365 with respect to the voltage at the terminal 367, as indicated by the vector 460 in FIG. 4, the regulator system 230 is responding only to the error signal from the error detecting circuit 350 and the minimum excitation circuit 310 has substantially no effect on the operation of said regulator system since the error signal from the error detecting circuit 350 is algebraically larger or more positive than the limit signal from the minimum excitation limit circuit 310. Assuming, however, that the system conditions change and the load on the generator 210 increases to the extent that the voltage across the resistor section 368B becomes greater in magnitude than the voltage across the resistor section 368A, then the minimum excitation circuit 310 will begin to affect the operation of the regulator system 230. For example, suppose that the polarity of the net voltage across the resistor section 368A and 368B reverses and the direction of the output signal from the minimum excitation limit circuit 310 also reverses as indicated by the vector 470 in FIG. 4. As soon as the output signal from the minimum excitation limit circuit becomes algebraically larger or more positive than the error signal from the error detecting circuit 350, as indicated by the vectors 470 and 450, respectively, in FIG. 4, the regulator system 230 then becomes responsive only to the output limit signal from the minimum excitation limit circuit 310 during the latter operating condition. When the output signal from the limit circuit 310 becomes more positive than the output error signal from the error detecting circuit 350 and the output limit signal is positive at the output terminal 367 with respect to the voltage at the output terminal 365, then current flows from left to right through the second control or net windings 314 through 320 of the magnetic amplifier 240 thus producing the magnetomotive forces as indicated by the solid arrows in FIG. 3. Since the net sum or total of the control ampere-turns of the magnetic amplifier 240 is responsive only to the output limit signal from the limiting circuit 310 during the latter assumed operating condition, the output of the section 242 of the amplifier 240 is increased and the output of the section 244 is decreased. This increases the magnitude of the current flow through the boost field winding 228 of the exciter 220 and decreases the magnitude of the current flow through the buck field winding 226. With such an increase in the magnitude of the current flow through the boost field winding 228, the output voltage of the exciter 220 is increased to increase the magnitude of the current flow to the field winding 212 of the generator 210 and thereby prevent the generator 210 from falling out of step or synchronism. The dotted arrows adjacent to the second control or limit windings 314 to 320 indicate the direction of the magnetomotive forces produced in the respective magnetic core members by the current flow through said second control windings when the apparatus shown in FIG. 3 is operating within the minimum excitation limit. It is to be noted that the minimum excitation limit disclosed in U.S. Patent No. 2,862,172, previously mentioned, may be modified to provide either a static minimum excitation limit or a dynamic minimum excitation limit.

The apparatus embodying the teachings of this invention has several advantages. For example, the output of an auctioneering circuit as disclosed is responsive only to the algebraically larger or smaller of two input control signals or currents regardless of whether one or both of said control signals reverses in direction or in polarity. In addition, several auctioneering circuits of the type disclosed may be cascaded to obtain an output which varies only with the largest of a plurality of input control signals greater than two.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In combination, a magnetic amplifier having control windings responsive to the sum of first and second input signals and an additional control winding, and means connected in circuit relation with said additional control winding for applying the magnitude of the difference between said input signals thereto, the output of said magnetic amplifier being responsive only to the larger of said input signals.

2. In combination a magnetic amplifier having control windings responsive to the sum of first and second input signals and an additional control winding, and rectifier means connected in circuit relation with said additional control winding for applying the magnitude of the difference between said input signals thereto, the output of said magnetic amplifier being responsive only to the larger of said input signals.

3. In combination, a magnetic amplifier having control windings responsive to the sum of first and second input signals and an additional control winding, the turns of said additional control winding being substantially equal to those of each of the first-mentioned control windings, and rectifier means connected in circuit relation with said additional control winding for applying the magnitude of the difference between said input signals thereto, the output of said magnetic amplifier being responsive only to the larger of said input signals.

4. In an electric control apparatus, a magnetic amplifier having first, second and third control windings and an output winding, said first and second control windings being responsive to first and second input control signals, respectively, and means connected in circuit relation with said third control winding for rendering said third control winding responsive to the magnitude of the difference between said first and second control signals, the output of said magnetic amplifier varying only with the larger of said input control signals.

5. In an electric control apparatus, a magnetic amplifier having first, second and third control windings and an output winding, said first and second control windings being responsive to first and second input control signals, respectively, and means connected in circuit relation with said third control winding for rendering said third control winding responsive to the magnitude of the difference between said first and second control signals, the output of said magnetic amplifier varying only with the smaller of said input control signals.

6. In an electric control apparatus, a magnetic amplifier having first, second and third control windings and an output winding, said first and second control windings being responsive to first and second input control signals, respectively, and rectifier means connected in circuit relation with said third control winding for rendering said third control winding responsive to the magnitude of the difference between said first and second control signals, the output of said magnetic amplifier varying only with the larger of said input control signals.

7. In an electric control apparatus, a magnetic amplifier having first, second and third control windings and an output winding, said first and second control windings being responsive to first and second input control signals, respectively, the turns of each of said control windings being substantially equal, and rectifier means connected in circuit relation with said third control winding for rendering said third control winding responsive to the magnitude of the difference between said first and second control signals, the output of said output winding of said magnetic amplifier varying only with the larger of said input control signals.

8. In an electric control apparatus, a magnetic amplifier having first, second and third control windings and an output winding, said first and second control windings being responsive to first and second input control signals, respectively, and means connected in circuit relation with said third control winding for rendering said third control winding responsive to the magnitude of the difference between said first and second control currents, the output of said output winding of said magnetic amplifier varying only with the larger of said input control currents.

9. In an electrical control apparatus, the combination comprising, amplifying means magnetically responsive to the sum of the input signals applied thereto, first means for applying a first input signal to said amplifying means, second means for applying a second input signal to said amplifying means, and third means for electrically applying the difference between first and second input signals as a third input signal to said amplifying means, the output of said amplifying means varying with only the larger of said first and second input signals.

10. In an electrical control apparatus, the combination comprising, amplifying means responsive to the sum of the input currents applied thereto, first means for applying a first input current to said amplifying means, second means for applying a second input current to said amplifying means, and third means for applying the difference between first and second input currents as a third input current to said amplifying means, the output of said amplifying means, varying with only the larger of said first and second input currents.

11. In an electrical control apparatus, the combination comprising, amplifying means responsive to the sum of the unidirectional input signals applied thereto, first means for applying a first unidirectional input signal to said amplifying means, second means for applying a second unidirectional input signal to said amplifying means, and third means for applying the difference between first and second unidirectional input signals as a third unidirectional input signal to said amplifying means, the output of said amplifying means varying with only the larger of said first and second unidirectional input signals.

12. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, second means connected in circuit relation between said first means and said field winding for controlling the excitation current supplied thereto in accordance with the net sum of the signals applied to said second means, third means connected in circuit relation between said output terminals and said second means for applying a limiting signal thereto during certain operating conditions, and fourth means connected in circuit relation with said second means for applying thereto the difference between said error signal and said limiting signal, the output of said second means varying only with the larger of said error and limiting signals.

13. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means connected in circuit relation between said first means and said field winding for controlling the excitation current supplied thereto in accordance with the net sum of the control signals applied to said magnetic amplifier means, second means connected in circuit relation between said output terminals and said magnetic amplifier means for applying a limiting signal thereto during certain operating conditions, and third means connected in circuit relation with said magnetic amplifier means for applying thereto the difference between said error signal and said limiting signal, the output of said magnetic amplifier means varying only with the larger of said error and limiting signals.

14. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, second means connected in circuit relation between said first means and said field winding for controlling the excitation current supplied thereto substantially in accordance with the net sum of the signals applied to said second means, third means connected in circuit relation between said output terminals and said second means for applying a limiting signal thereto during certain operating conditions, and rectifier means connected in circuit relation with said second means for applying thereto the difference between said error signal and said limiting signal, the output of said second means varying only with the larger of said error and limiting signals.

15. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means connected in circuit relation between said first means and said field winding for controlling the excitation current supplied thereto, second means connected in circuit relation between said output terminals and said magnetic amplifier means for applying a limiting signal thereto during certain operating conditions, and rectifier means connected in circuit relation with said magnetic amplifier means for applying thereto the difference between said error signal and said limiting signal, the output of said magnetic amplifier means varying only with the larger of said error and limiting signals.

16. In a regulator system for maintaining the output voltage of a dynamoelectric machine having output terminals and an excitation field winding at substantially a predetermined value, the combination comprising, first means for obtaining an error control current which varies with the deviation of said output voltage from said predetermined value, second means connected in circuit relation between said first means and said field winding for controlling the excitation current supplied thereto in accordance with the sum of the control currents applied to said second means, third means connected in circuit relation between said output terminals and said second means for applying a limiting control current thereto during certain operating conditions, and fourth means connected in circuit relation with said second means for applying thereto the difference between said error control current and said limiting control current, the output of said second means varying only with the larger of said error and limiting currents.

17. In a regulator system for maintaining the output voltage of a dynamoelectric machine having output terminals and an excitation field winding at substantially a predetermined value, the combination comprising, first means for obtaining an error control current which varies with the deviation of said output voltage from said predetermined value, magnetic amplifier means connected in circuit relation between said first means and said field winding for controlling the excitation current supplied thereto in accordance with the net sum of the control currents applied to said magnetic amplifier means, third means connected in circuit relation between said output terminals and said magnetic amplifier means for applying a limiting control current thereto during certain operating conditions, and third means connected in circuit relation with said magnetic amplifier means for applying thereto the difference between said error control current and said limiting control current, the output of said magnetic amplifier means varying only with the larger of said error and limiting control currents.

18. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, amplifying means connected in circuit relation between said first means and said field winding for controlling the excitation current supplied thereto in accordance with the net sum of the signals applied to said amplifying means, second means connected in circuit relation between said output terminals and said amplifying means for applying a limiting signal thereto during certain operating conditions, and third means connected in circuit relation with said amplifying means for applying thereto the difference between said error signal and said limiting signal, the output of said amplifying means varying only with the larger of said error and limiting signals.

19. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means having control windings connected in circuit relation between said first means and said field winding for controlling the excitation current supplied thereto in accordance with the signals applied to said control windings, second means connected in circuit relation with said output terminals for obtaining a limiting signal, the sum of said error and limiting signals being applied to certain of said control windings, and third means connected in circuit relation with another of said control windings for applying thereto the difference between said error and limiting signals, the output of said magnetic amplifier means varying with the larger of said error and limiting signals.

20. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means having a plurality of control windings connected in circuit relation between said first means and said field winding for controlling the excitation current supplied thereto in accordance with the signals applied to said control windings, second means connected in circuit relation with said output terminals for obtaining a limiting signal, the sum of said error and limiting signals being applied to certain of said control windings, and rectifier means connected in circuit relation with another of said control windings for applying thereto the difference between said error and limiting signals, the output of said magnetic amplifier means varying with the larger of said error and limiting signals.

21. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means having first, second and third control windings connected in circuit relation between said first means and said field winding for controlling the excitation current supplied thereto in accordance with the signals applied to said control windings, second means connected in circuit relation with said output terminals for obtaining a limiting signal, said error and limiting signals being applied to said first and second control windings respectively, and third means connected in circuit relation with said third control winding for applying thereto the difference between said error and limiting signals, the output of said magnetic amplifier means varying with only the larger of said error and limiting signals.

22. In a regulator system for maintaining the output voltage of a dynamoelectric machine having output terminals and an excitation field winding at substantially a predetermined value, the combination comprising, first means for obtaining an error signal which varies with the deviation of said output voltage from said predetermined value, magnetic amplifier means having first, second and third control windings connected in circuit relation between said first means and said field winding for controlling the excitation current supplied thereto in accordance with the signals applied to said control windings, second means connected in circuit relation with said output terminals for obtaining a limiting signal, said error and limiting signals being applied to said first and second control windings, respectively, and rectifier means connected in circuit relation with said third control winding for applying thereto the difference between said error and limiting signals, the output of said magnetic amplifier means varying with only the larger of said error and limiting signals.

No references cited.